United States Patent [19]
Kawada et al.

[11] Patent Number: 4,518,916
[45] Date of Patent: May 21, 1985

[54] SYSTEM FOR DETECTING ROTATIONAL SPEED

[75] Inventors: Shigeki Kawada, Hino; Hiroshi Ishida, Tokyo, both of Japan

[73] Assignee: Fujitsu Fanuc Limited, Tokyo, Japan

[21] Appl. No.: 395,020

[22] PCT Filed: Oct. 29, 1981

[86] PCT No.: PCT/JP81/00313
§ 371 Date: Jun. 23, 1982
§ 102(e) Date: Jun. 23, 1982

[87] PCT Pub. No.: WO82/01594
PCT Pub. Date: May 13, 1982

[30] Foreign Application Priority Data
Oct. 30, 1980 [JP] Japan .................. 55-151453

[51] Int. Cl.³ ..................... G01P 3/48; G01P 3/54
[52] U.S. Cl. ............................................. 324/173
[58] Field of Search ............ 324/174, 173, 166, 168, 324/175

[56] References Cited
U.S. PATENT DOCUMENTS
4,228,396 10/1980 Palombo et al. .................. 324/175

FOREIGN PATENT DOCUMENTS
1141433 1/1969 United Kingdom .

Primary Examiner—Stanley T. Krawczewicz
Attorney, Agent, or Firm—Armstrong, Nikaido, Marmelstein & Kubovcik

[57] ABSTRACT

A system for detecting the rotational speed of a rotating body comprising the steps of generating two kinds of signals A and B having alternating wave forms and corresponding to the rotational speed of the rotating body by means of position-detecting devices (5a, 5b), the signals A and B having the same amplitude and having phases deviating by 90°, producing switching signals S(A), S($\overline{A}$), S(B), and S($\overline{B}$) from the signals A and B by means of zero-cross circuits (711, 712), producing inverted signals $\overline{A}$ and $\overline{B}$ from the signals A and B by means of inverter circuits (72, 73), producing differentiation signals dA, $\overline{dA}$, dB, and $\overline{dB}$ by supplying the signals A, $\overline{A}$, B and $\overline{B}$ to differentiation circuits (74, 75, 76, 77), and obtaining output signals corresponding to the rotational speed of the rotating body by selectively switching the differentiation signals dA, $\overline{dA}$, dB, and $\overline{dB}$ in a switching circuit 78 by means of the switching signals S(A), S($\overline{A}$), S(B), and S($\overline{B}$), thereby detecting the rotational speed of the rotating body.

1 Claim, 7 Drawing Figures

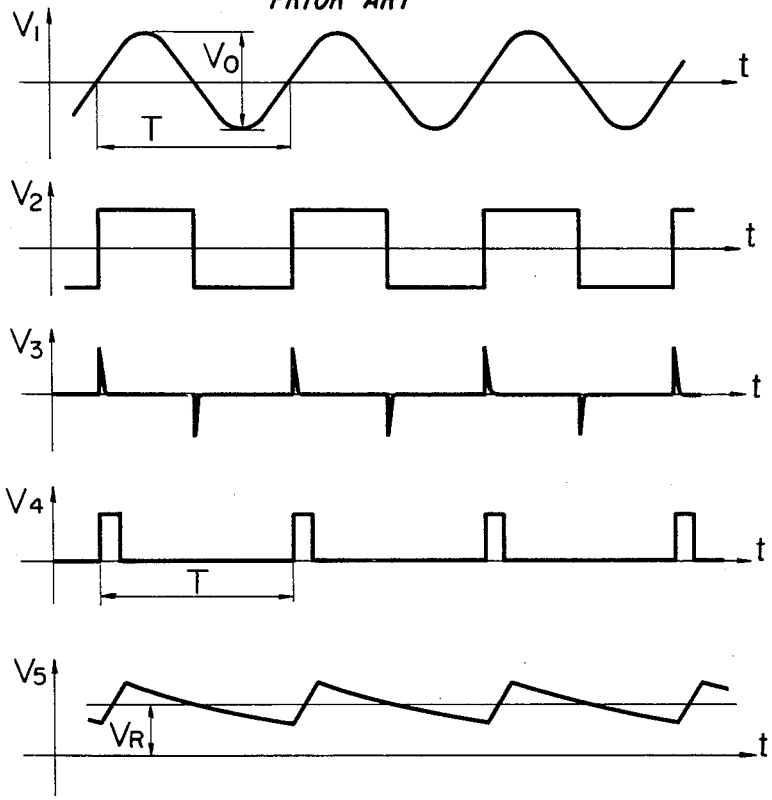

SYSTEM FOR DETECTING ROTATIONAL SPEED

FIELD OF THE INVENTION

The present invention relates to a system for detecting the rotational speed of a rotating body.

BACKGROUND OF THE INVENTION

A conventional system for detecting the rotational speed of a rotating body usually consists of generating a signal which corresponds to the rotational position of the rotating body and processing this signal so as to obtain a rotational speed-detecting signal.

FIGS. 1A and 1B schematically illustrate a device which is usually used for obtaining a rotational position-detecting signal in the system for detecting rotational speed.

In FIG. 1A, a rotary disc 3 is attached to a rotary shaft 2 of a rotating body 1 of which the rotating speed is to be detected and is permitted to rotate together with the rotating body 1. An electromagnetic position detector element 4 is secured at a position adjacent to the peripheral surface of the rotary disc 3 to detect the rotational position. FIG. 1B illustrates the position detector element 4 and the rotary disc 3 on an enlarged scale. As shown in FIG. 1B, a predetermined number N of projections 31 are formed around the circumference of the rotary disc 3 in the form of a gear, the projections 31 being arrayed so as to equally divide the whole circumference of the rotary disc 3. As the rotary disc 3 rotates, the individual projections 31 successively pass a position adjacent to the position detector element 4. Therefore, the distance between the position detector element 4 and the rotary disc 3 alternates, whereby the position detector element 4 produces an output signal 5 having a sinusoidal wave form. The frequency of the sinusoidal wave changes in proportion to the rotational speed of the rotating body 1, but the amplitude remains constant irrespective of the rotational speed.

FIG. 2 illustrates a conventional circuit 6 which is used for converting the output signal 5 of the position detector element 4 into a signal that is proportional to the rotational speed. FIG. 3 shows various voltage wave forms which indicate the operation characteristics of the circuit of FIG. 2.

In FIG. 2, the output signal 5 of the position detector element 4 is supplied to one input terminal of a comparator 61, another input terminal of which is connected to Ov. The output signal 5 of the position detector element 4 assumes a sinusoidal wave form as denoted by $V_1$ in FIG. 3, and the output signal of the comparator 61 assumes a rectangular wave form as denoted by $V_2$ in FIG. 3. The output signal of the comparator 61 is supplied to the input terminal of a differentiation filter 62, and the output signal $V_3$ of the differentiation filter 62 is supplied to a one-shot circuit 63. The output signal $V_4$ of the one-shot circuit 63 is supplied to a low-pass filter 64 and the output signal $V_5$ of the low-pass filter 64 is produced as a rotational speed-detecting signal.

The output signal $V_3$ of the differentiation filter 62 has positive pulses that correspond to the rising portions of the rectangular wave $V_2$ and negative pulses that correspond to the falling portions of the rectangular wave $V_2$. Responsive to positive pulses in the output signal $V_3$, the one-shot circuit 63 produces rectangular pulses which have a predetermined amplitude and a predetermined time width. The rectangular pulse signal $V_4$ has a pulse frequency which is the same as the frequency of the sinusoidal wave $V_1$. Therefore, the value obtained by averaging the rectangular pulse signal $V_4$ with regard to the time, i.e., a D.C. component of the rectangular pulse signal $V_4$, changes in proportion to the frequency of the sinusoidal wave $V_1$ and, hence, changes in proportion to the rotational speed of the rotating body 1. The rectangular pulse signal $V_4$ is smoothed by the low-pass filter 64. As denoted by $V_5$ in FIG. 3, therefore, a D.C. voltage signal having a pulsating component is produced at the output terminal of the circuit 6 of FIG. 2, the voltage of the D.C. voltage signal $V_5$ being proportional to the rotational speed of the rotating body 1.

In the method of detecting the rotational speed by using the apparatus shown in FIGS. 1A, 1B, and 2, the rectangular pulses are smoothed by the low-pass filter 64 to obtain a D.C. wave form. Therefore, the filter must have a relatively large time constant. Further, a limitation is imposed on the response characteristics in detecting the speed, and the ripple ratio increases with a decrease in the rotational speed.

DISCLOSURE OF THE INVENTION

In view of the problems inherent in the above-mentioned conventional art, the principal object of the present invention is to provide a system for detecting rotational speed in which the ripple ratio is relatively small and remains nearly constant irrespective of the rotational speed and detection is delayed very little relative to the change in speed, the system being capable of obtaining rotational speed-detecting signals at a high precision.

According to the present invention, there is provided a system for detecting the rotational speed of a rotating body comprising the steps of generating signals A and B having an a alternating wave form and corresponding to the rotational speed of the rotating body by using position-detecting devices, the signals A and B having the same amplitude and having phases that deviate by 90°, producing switching signals S(A), S($\overline{A}$), S(B), and S($\overline{B}$) from the signals A and B by using zero-cross circuits (circuits which detect the points at which the wave crosses the zero line), producing inverted signals $\overline{A}$ and $\overline{B}$ from the signals A and B by using inverter circuits, producing differentiation signals dA, $\overline{dA}$, dB, and $\overline{dB}$ by supplying the signals A, $\overline{A}$, B, and $\overline{B}$ to differentiation circuits consisting of resistors and capacitors, and obtaining output signals corresponding to the rotational speed of the rotating body by selectively switching the differentiation signals dA, $\overline{dA}$, dB, and $\overline{dB}$ in the switching circuits by using the switching signals S(A), S($\overline{A}$), S(B), and S($\overline{B}$), thereby detecting the rotational speed of the rotating body.

BRIEF DESCRIPTION OF THE DRAWINGS

FIG. 2 is a diagram of a circuit which converts the rotational position-detecting signals into rotational speed-detecting signals in a conventional system for detecting rotational speed;

FIG. 3 is a characteristic diagram showing various voltage wave forms in the circuit of FIG. 2;

BEST MODE OF THE EMBODIMENT FOR CARRYING OUT THE INVENTION

A system for detecting rotational speed according to an embodiment of the present invention will be described below in conjunction with FIGS. 1A, 1C, 4, and 5.

Figure 1A:
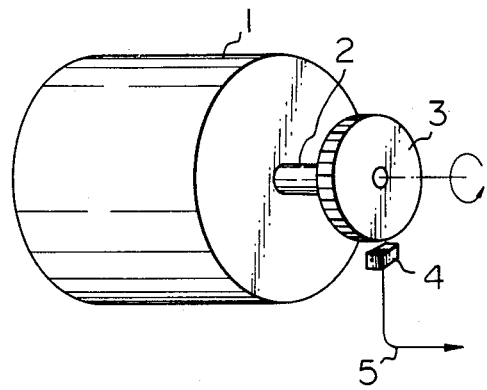
FIGS. 1A, 1B, and 1C are diagrams schematically illustrating an apparatus which is generally used for obtaining rotational position-detecting signals in a rotating body.
Figure 1B:
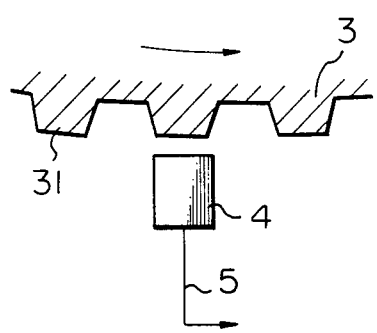
Figure 1C:
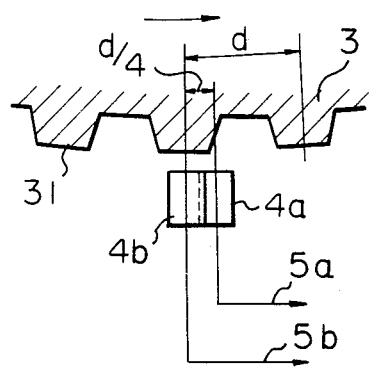

FIG. 1A shows the rotating body 1, rotary shaft 2, rotary disc 3, and electromagnetic position detector element 4 as described above. As shown in FIG. 1C, in the system for detecting rotational speed according to the present invention, however, use is made of two electromagnetic position detector elements 4a, 4b, unlike in the above-mentioned conventional system. The rotary disc 3 has, for instance, 256 projections 31, that equally divide the whole circumference of the disc 3. If the distance between the centers of the two neighboring projections 31 is denoted by d, the two position detector elements 4a, 4b are arrayed so as to deviate by d/4 in the circumferential direction of the disc.

Figure 4:
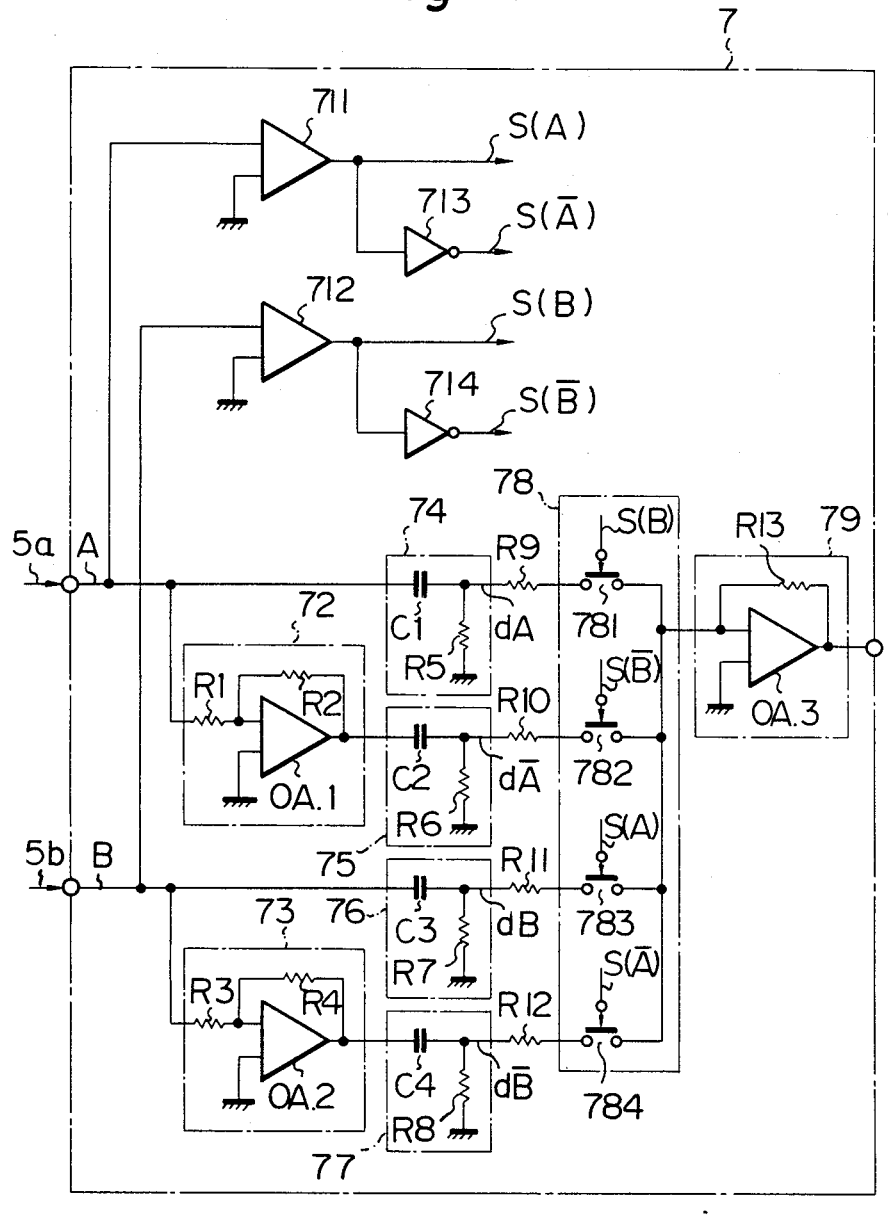
FIG. 4 is a diagram of a circuit which converts the rotational position-detecting signals into rotational speed-detecting signals in a system for detecting rotational speed according to an embodiment of the present intention.
Figure 5:
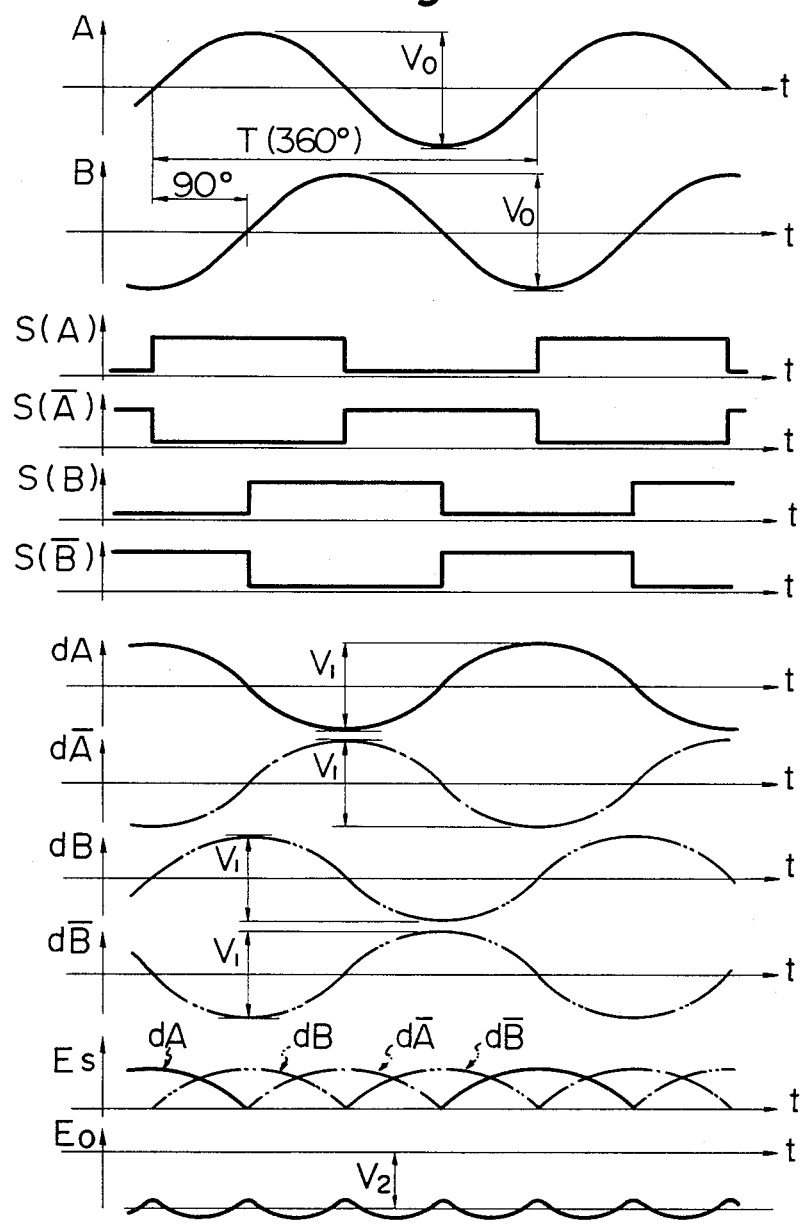
FIG. 5 is a characteristic diagram showing various voltage wave forms in the circuit of FIG. 4.

FIG. 4 illustrates a circuit 7 which converts the output signals 5a, 5b of the two position detector elements 4a, 4b into rotational speed-detecting signals in the system for detecting rotational speed contemplated by the present invention. Various voltage wave forms for illustrating the operation of the circuit 7 of FIG. 4 are shown in FIG. 5. The output signals 5a, 5b of the position detector elements 4a, 4b have voltage wave forms denoted by A and B in FIG. 5. The signals A and B assume sinusoidal wave forms having an equal amplitude $V_0$ irrespective of the rotational speed and having a frequency $f_0$ which varies in proportion to the rotational speed. The signal A has a phase which is in advance of the phase of the signal B by 90°. The signals A and B are supplied to zero-cross circuits 711, 712 which produce switching signals S(A), S(B). The switching signals S(A), S(B) are inverted by digital inverter circuits 713, 714, whereby two more switching signals $S(\overline{A})$ and $S(\overline{B})$ are formed. The signals A, B are also supplied to analog inverter circuits 72, 73 which produce inverted signals $\overline{A}$, $\overline{BS}$. The four inverted signals A, $\overline{A}$, B, and $\overline{B}$ are supplied, respectively, to differentiation circuits 74, 75, 76, and 77, each consisting of a resistor and a capacitor. The differentiation circuits 74, 75, 76, and 77 produce the differentiation signals dA, $\overline{dA}$, dB, and $\overline{dB}$ shown in FIG. 5. The gains of the differentiation circuits 74, 75, 76, and 77 are proportional to the frequency f of the input signals, and, hence, the amplitude $V_1$ of the differentiation signals dA, $\overline{dA}$, dB and $\overline{dB}$ is proportional to the frequency $f_0$ of the signals A and B. As mentioned above, the frequency $f_0$ is proportional to the rotational speed of the rotating body 1, and the amplitude $V_1$ of the differentiation signals dA, $\overline{dA}$, dB, and $\overline{dB}$ varies in proportion to the rotational speed of the rotating body 1. The differentiation signals dA, $\overline{dA}$, dB, and $\overline{dB}$ are supplied to a switching circuit 78 through the resistors R9, R10, R11, and R12, respectively. The switching elements 781, 782, 783, and 784 in the switching circuit 78 are opened and closed in response to the switching signals S(B), $S(\overline{B})$, S(A) and $S(\overline{A})$. In FIG. 5, the symbol Es represents wave forms which are switched by the switching elements, i.e., switched signals. The switched signals Es are supplied to the input terminal of a summing amplifier circuit 79 in which the signals Es are added, inverted, and amplified. Therefore, the summing amplifier circuit 79 produces an output signal having a voltage wave form denoted by $E_0$ in FIG. 5. The average value $V_2$ of the output signal $E_0$ varies in proportion to the amplitude $V_1$ of the differentiation signals dA, $\overline{dA}$, dB, and $\overline{dB}$ and, hence, varies in proportion to the rotational speed of the rotating body 1. The output signal $E_0$ of the summing amplifier circuit 79 is supplied to the output terminal of the converter circuit 7. As mentioned above, therefore, the converter circuit 7 converts the signals A, B from the two position detector devices 4a, 4b into a rotational speed-detecting signal $E_0$.

The rotational speed-detecting signal $E_0$ of the rotating body 1 obtained by the system for detecting rotational speed in the present invention does not pass through a low-pass filter and, hence, is not delayed in relation to the change in the rotational speed and, further, have a relatively small ripple ratio. Moreover, the detection signal $E_0$ maintains the same ripple ratio even when the rotational speed changes over very wide ranges and, therefore, makes it possible to detect even very small rotational speeds.

According to the system of the present invention, therefore, it is possible to obtain a rotational speed-detecting signal at a very high precision, suppress the ripple ratio at a relatively small value, keep the ripple ratio nearly constant irrespective of the rotational speed, and eliminate a delay in detection of the rotational speed even when the speed is changed.

We claim:

1. A system for detecting the rotational speed of a rotating body comprising the steps of:

generating two kinds of signals A and B having alternating wave forms and corresponding to the rotational speed of said rotating body by means of an electromagnetic position-detecting device including a rotary disc having circumferential projections and fixed electromagnetic position detector elements, said signals A and B having the same amplitude and the phases of said signals A and B always differing by 90°, producing switching signals S(A), $S(\overline{A})$, S(B), and $S(\overline{B})$ from said signals A and B by means of zero-cross circuits and also producing inverted signals $\overline{A}$ and $\overline{B}$ from said signals A and B by means of inverter circuits, producing differentiation signals dA, $\overline{dA}$, dB, and $\overline{dB}$ from differentiation circuits consisting of resistors and capacitors to which the produced signals A, $\overline{A}$, B, and $\overline{B}$ are suppllied and obtaining output signals corresponding to the rotational speed of said rotating body by selectively switching the differentiation signals dA, $\overline{dA}$, dB, and $\overline{dB}$ in switching circuits in accordance with switching signals S(A), $S(\overline{A})$, S(B), and $S(\overline{B})$ applied to the switching circuits, whereby the rotational speed of said rotational body is detected as a direct current voltage signal having an amplitude proportional to the rotational speed of the rotating body and having a small ripple ratio.

* * * * *